(12) United States Patent
Davidian et al.

(10) Patent No.: US 6,257,288 B1
(45) Date of Patent: Jul. 10, 2001

(54) WATERING DEVICE

(75) Inventors: Steven L. Davidian, 179 High St., Chagrin Falls, OH (US) 44022; Benson T. Nicholl, Chagrin Falls, OH (US); David L. Butler, Ravenna, OH (US)

(73) Assignee: Steven L. Davidian, Chagrin Falls, OH (US)

( * ) Notice: Subject to any disclaimer, the term of this patent is extended or adjusted under 35 U.S.C. 154(b) by 0 days.

(21) Appl. No.: 09/525,967

(22) Filed: Mar. 15, 2000

(51) Int. Cl.$^7$ ................. B65B 1/04; B65B 3/04; B67C 3/00
(52) U.S. Cl. ............ 141/324; 141/18; 141/198; 119/51.01; 119/51.5; 119/72
(58) Field of Search ............... 119/51.01, 51.5, 119/51.12, 72, 75, 74; 222/650, 187, 189.02, 189.06; 141/18, 192, 198, 311 R, 324, 363, 364, 365, 366; 239/44, 46, 273, 275, 308, 553, 554

(56) References Cited

U.S. PATENT DOCUMENTS

| | | |
|---|---|---|
| D. 207,166 | 3/1967 | Noble . |
| D. 234,144 | 1/1975 | Fassauer . |
| D. 364,942 | 12/1995 | Vanskiver et al. . |
| D. 402,428 | 12/1998 | Chrisco . |
| D. 406,926 | 3/1999 | Kolozsvari . |
| 2,364,991 | 12/1944 | Marshall . |
| 2,573,802 | 11/1951 | Mitchell . |
| 3,083,879 * | 4/1963 | Coleman ........................ 222/143 |
| 3,720,184 | 3/1973 | Pearce . |
| 5,064,096 * | 11/1991 | Illing et al. ..................... 222/105 |
| 5,636,592 * | 6/1997 | Wechsler ........................ 119/52.1 |
| 5,687,783 | 11/1997 | Finnegan . |
| 5,792,390 * | 8/1998 | Marino .......................... 261/72.1 |
| 5,850,972 * | 12/1998 | Campau .......................... 239/44 |
| 5,857,484 | 1/1999 | Davidian . |

* cited by examiner

Primary Examiner—Timothy L. Maust
(74) Attorney, Agent, or Firm—Jones, Day, Reavis & Pogue

(57) ABSTRACT

A watering device for use with an open basin includes a tank structure, a support structure and a nozzle. The tank structure is supported by the support structure and encloses a reservoir. Fluid flow through the nozzle is controlled by a surface seal between the nozzle and the open basin. When the watering device is overturned, it pivots about certain edges of the nozzle and tank structure until it lands in a stable rest position. The nozzle is then located above the water level in the reservoir so that the fluid cannot drain from the reservoir.

10 Claims, 4 Drawing Sheets

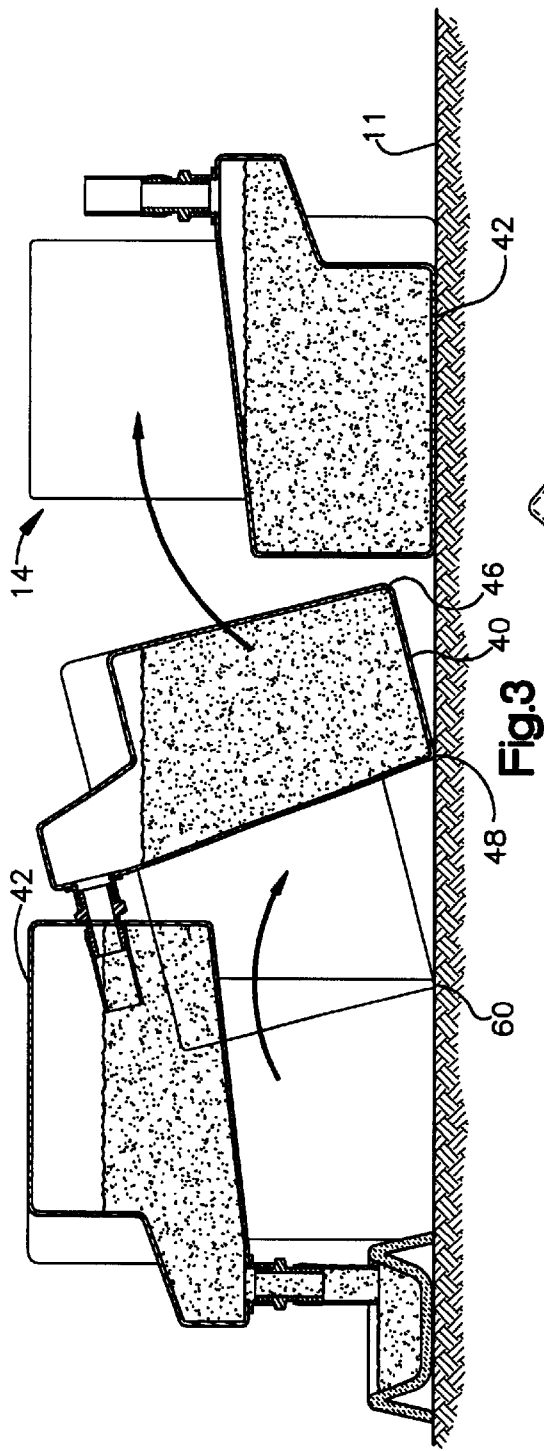
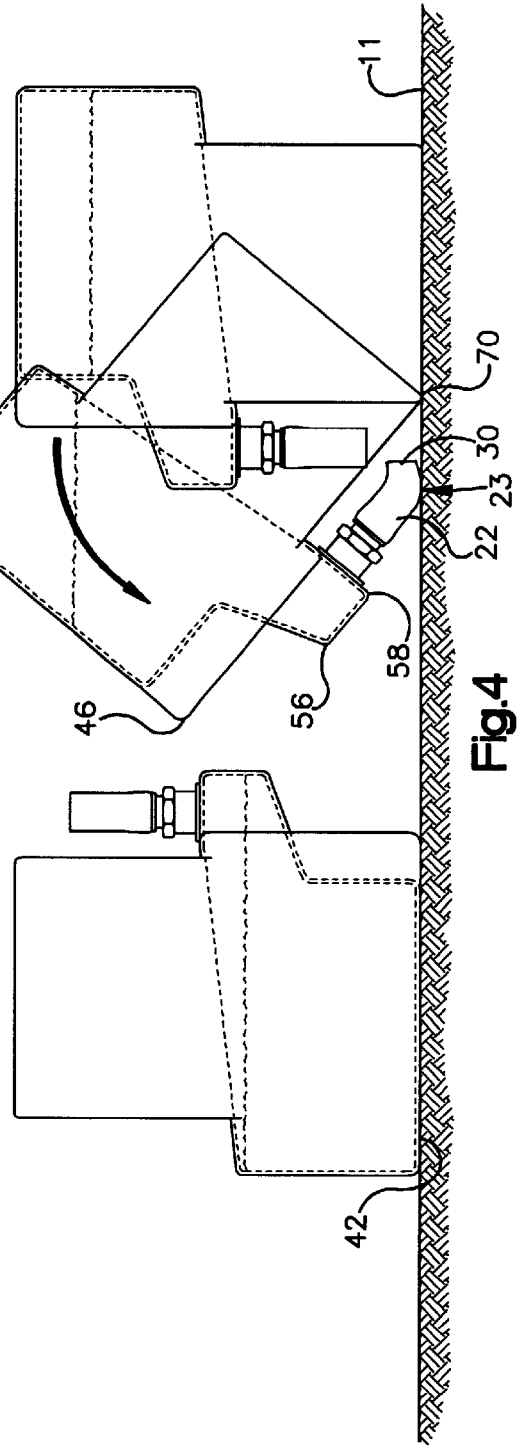

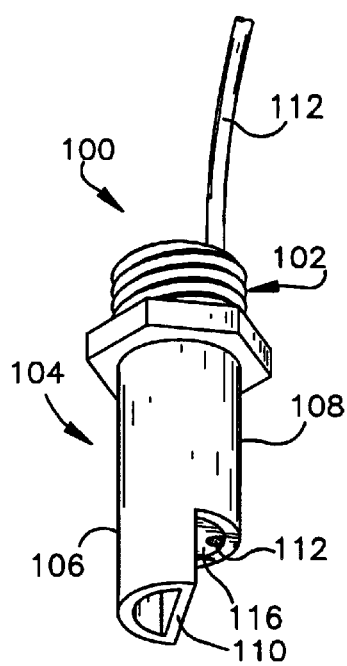
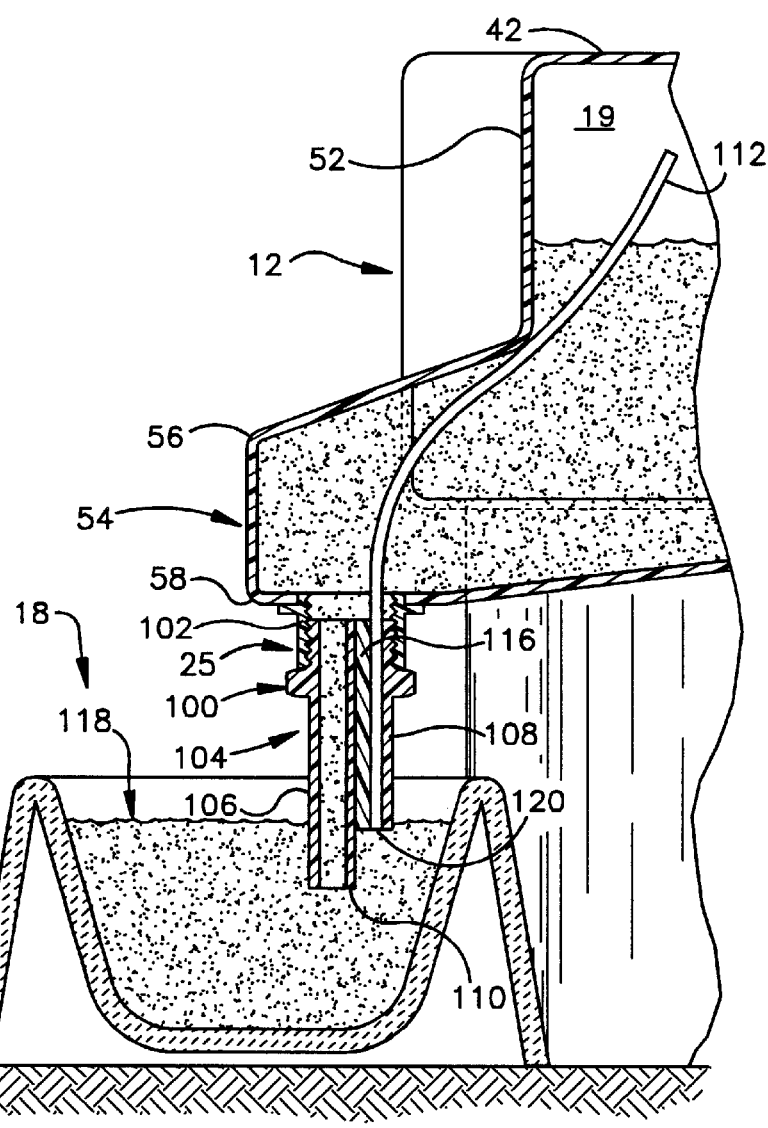
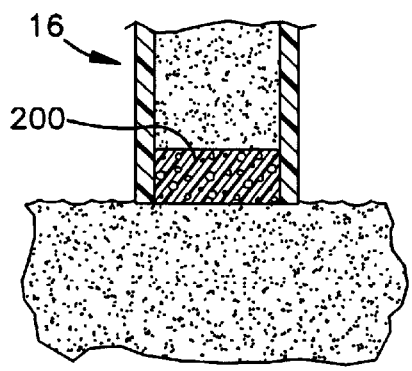
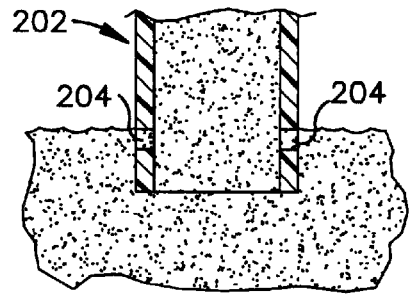

WATERING DEVICE

FIELD OF THE INVENTION

The present invention relates to watering devices for use with open basins.

BACKGROUND OF THE INVENTION

An open basin, such as a pet's water dish, a Christmas tree stand, or the like, can be supplied with water from a watering device. A particular type of watering device includes a tank structure with a nozzle. A surface seal between the nozzle and the open basin controls the flow of water into the basin. Since the use of a surface seal requires the fluid reservoir inside the tank to be elevated above the open basin, the device is generally top heavy and inherently unstable.

SUMMARY OF THE INVENTION

The present invention is an apparatus for use with an open receiving basin. In accordance with a principal feature of the invention, the apparatus comprises a tank structure and a support structure. The tank structure encloses a reservoir and is configured to have an upright position. The support structure supports the tank structure above a floor surface in the upright position. A nozzle on the tank structure drains the reservoir to an open receiving basin when the tank structure is in the upright position. The tank structure is configured to have a stable rest position when overturned from the upright position. Importantly, the nozzle is oriented not to drain the reservoir when the tank structure is in the stable rest position.

In accordance with another principal feature of the invention, the tank structure and the nozzle have pivot edges configured to direct the apparatus from its upright position to the stable rest position when the apparatus is overturned. When the apparatus is in the stable rest position, it is supported by a planar upper surface of the tank structure.

BRIEF DESCRIPTION OF THE DRAWINGS

FIG. 3 is an overlaid view of the upright position, an intermediate backward rolling position, and the rest position of the apparatus;

FIG. 4 is an overlaid view of the upright position, an intermediate forward rolling position, and the rest position of the apparatus;

FIG. 5 is an orthogonal view of an alternative nozzle constructed in accordance with the invention;

FIG. 6 is a view similar to FIG. 2 showing the alternative nozzle in use; and

FIGS. 7 and 8 are enlarged partial views of parts of alternative embodiments of the invention.

DESCRIPTION OF A PREFERRED EMBODIMENT

Figure 1:
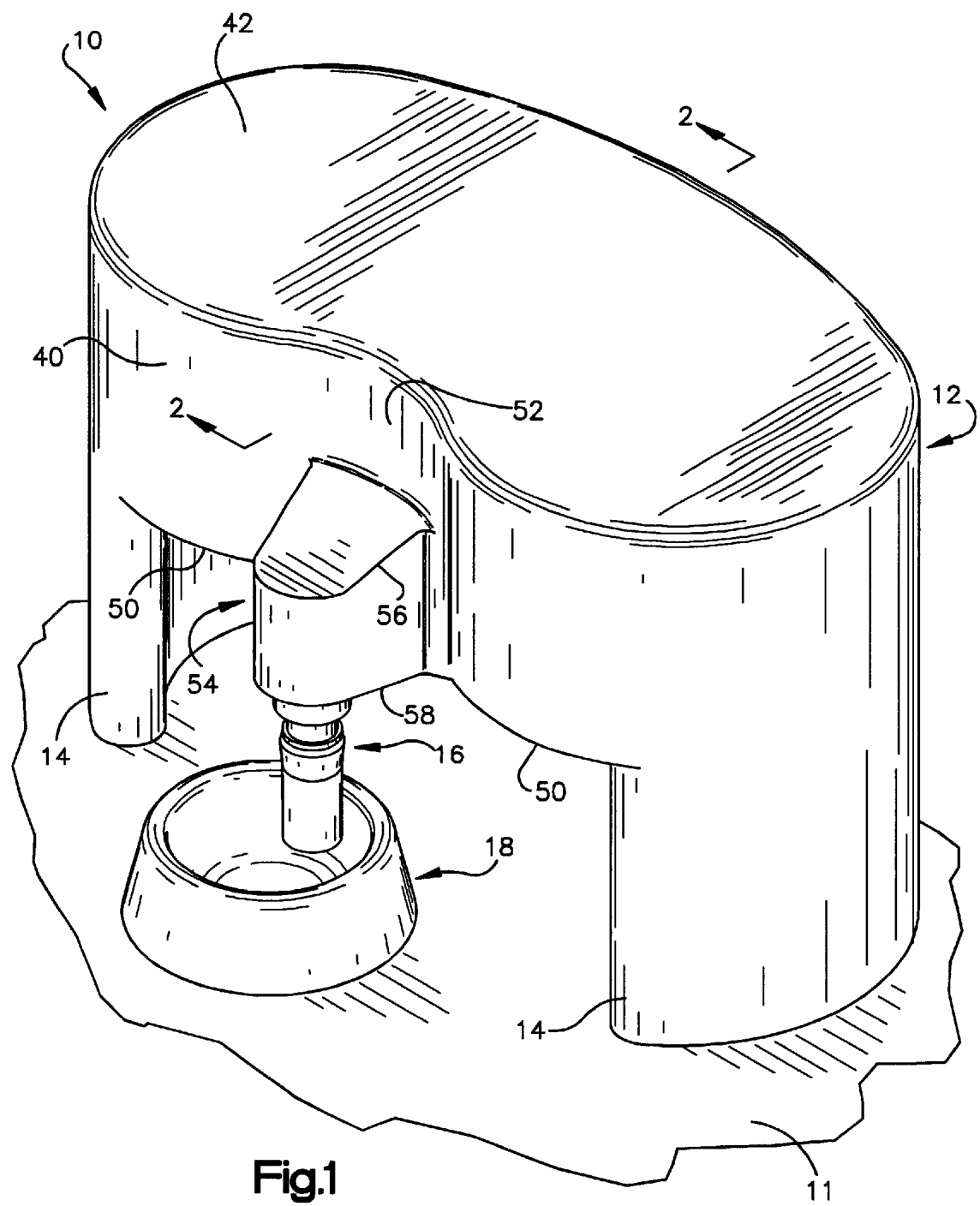
FIG. 1 is an orthogonal view of an apparatus comprising a preferred embodiment of the present invention.
Figure 2:
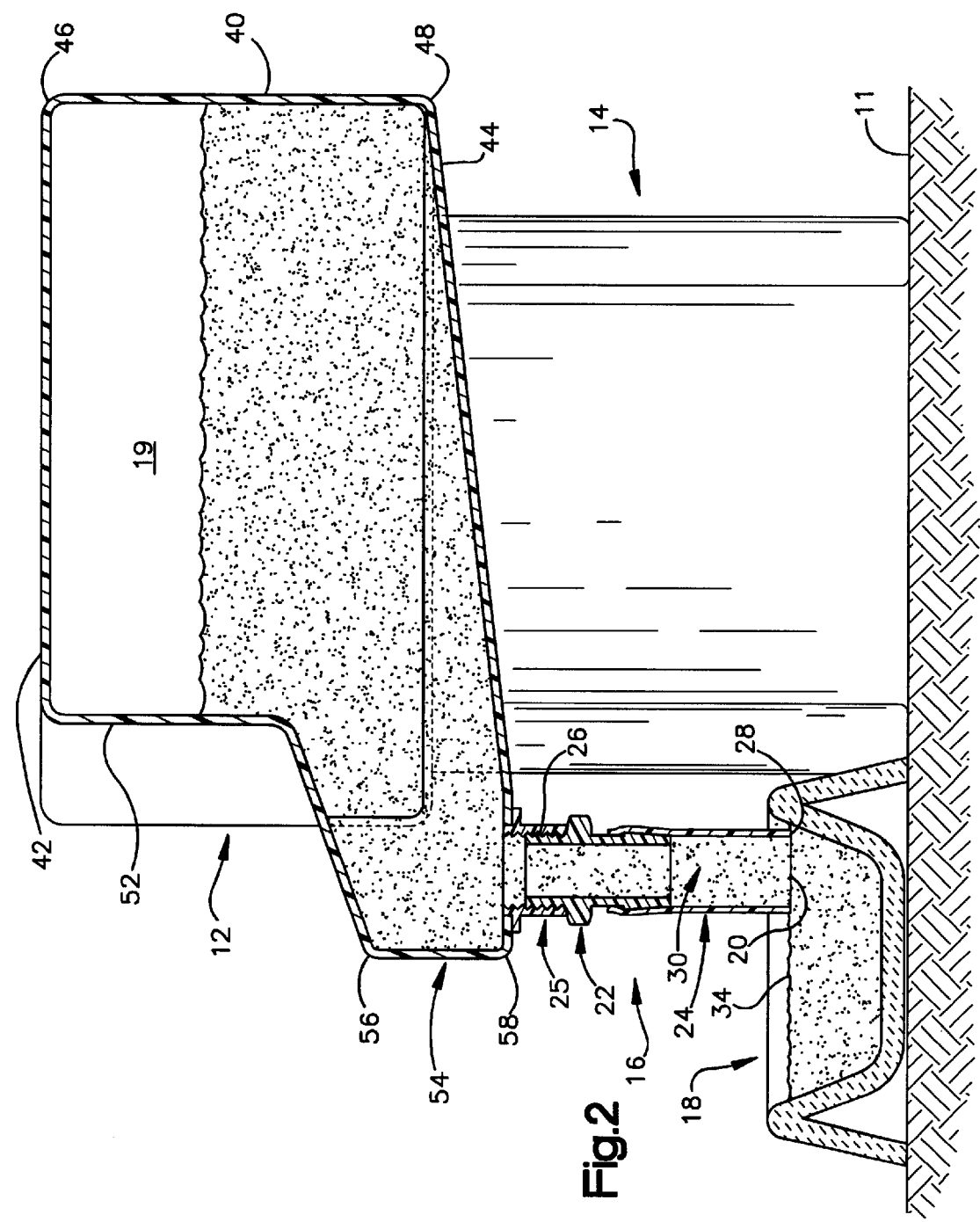
FIG. 2 is a view taken on line 2—2 of FIG. 1.

A watering device 10 comprising a preferred embodiment of the present invention is shown in FIG. 1 resting on a floor surface 11. The watering device 10 comprises a tank structure 12, a support structure 14, and a nozzle 16. Also shown in FIG. 1 is an open receiving basin 18. A liquid, which in the preferred embodiment is water, is held within the tank structure 12 in a reservoir 19 (FIG. 2). The support structure 14 supports the tank structure 12 above the receiving basin 18. In the preferred embodiment, the support structure 14 is a pair of legs. A surface seal 20 controls the amount of water that drains into the receiving basin 18.

The nozzle 16 projects downward from the tank structure 12 and has a plurality of parts including: a hard nozzle 22, a soft nozzle 24, and a nozzle adapter 25. The soft nozzle 24 is press fitted over the hard nozzle 22. The hard nozzle 22 has a threaded end portion 26 screwed into the nozzle adapter 25 and can be advanced or retracted in the nozzle adapter 25. The hard nozzle 22, soft nozzle 24 and nozzle adapter 25 have concentric bores that together define a nozzle bore 30. A lower edge 28 of the soft nozzle 24 is the lowest edge surface of the nozzle 16.

The surface seal 20 is formed when the water surface 34 in the receiving basin 18 reaches the height of the lower edge 28 of the soft nozzle 24. Air is then blocked from entering the nozzle bore 30 and the water surface 34 can no longer rise due to the formation of the surface seal 20. If the water surface 34 falls below the level of the lower edge 28 of the soft nozzle 24, air will then enter the tank structure 12 through the nozzle bore 30 and allow water to flow from the reservoir 19 to the receiving basin 18. When the water surface 34 rises to the lower edge 28 of the soft nozzle 24, air is again restricted from entering the nozzle bore 30 and the surface seal 20 is reformed.

The tank structure 12 has an elongated, generally elliptical shape. This shape is defined by a peripheral side wall surface 40, a planar upper surface 42, and a planar lower surface 44 (FIG. 2). The lower surface 44 differs from the upper surface 42 because the support structure 14 projects downward from the lower surface 44 at the opposite ends of the tank structure 12 and foreshortens the ends of the lower surface 44. An upper edge 46 of the tank structure 12 is the peripheral edge of the upper surface 42. A lower rear edge 48 is formed where the side wall surface 40 and the lower surface 44 meet in the rear of the tank structure 12. A lower forward edge 50 is formed where the side wall surface 40 and the lower surface 44 meet in the front of the tank structure 12.

At the front of the tank structure 12, the side wall surface 40 has a concave indentation 52 (FIG. 1). A nozzle housing 54 projects from the concave indentation 52. An upper housing edge 56 extends from the concave indentation 52 around the front of the nozzle housing 54. A lower housing edge 58 extends from the lower forward edge 50 around the nozzle housing 54. In the preferred embodiment, these edges define pivot axes as the tank structure 12 rolls from the upright position to a stable rest position, as described below.

When tipped from its upright position the watering device 10 rolls to a stable rest position in which it rests on the upper surface 42. When resting on the upper surface 42, the watering device 10 does not lose fluid through the nozzle bore 30, as shown in FIGS. 3 and 4. The watering device 10 is configured for either a backward roll, as shown in FIG. 3, or a forward roll, as shown in FIG. 4.

As the watering device 10 is tipped backward from the upright position (FIG. 3, left hand side), it pivots about the support structure 14 and falls backward toward the lower rear edge 48. When the lower rear edge 48 strikes the floor 11 (FIG. 3, middle of the page), the watering device 10 is momentarily supported in a rearward intermediate position by a rear edge 60 of the support structure 14 and the lower rear edge 48. The momentum of the watering device 10 then pivots the watering device 10 about the lower rear edge 48. As the watering device 10 continues to roll backward, it momentarily rests on the side wall 40. The side wall 40 acts as a transition surface as the watering device 10 rotates from the intermediate position and begins a final pivot. As the momentum decreases, the watering device 10 pivots about the upper edge 46. The watering device 10 lands on the upper surface 42 after pivoting about the upper edge 46 (FIG. 3, right hand side of page). When the upper surface 42 overlies the floor 11, the watering device 10 no longer rolls because the upper surface 42 is configured with a sufficiently wide area which does not allow the watering device 10 to further pivot. Water does not leak from the reservoir 19 in this position because the water in the reservoir 19 is below the lower edge 28 of the soft nozzle 24.

When the watering device 10 is tipped forward as shown in FIG. 4, it pivots about the forward edge 70 of the support structure 14 from the upright position (FIG. 4, right hand side of page) toward an intermediate forward position (FIG. 4, middle of the page). In the intermediate forward position, the watering device 10 is supported on the hard nozzle 22 and the support structure 14. The soft nozzle 24 is then deformed and the flow area of the nozzle bore 30 is reduced. This reduces the flow rate through the nozzle bore 30. As the watering device 10 continues to rotate toward the stable rest position, two more intermediate pivot edges, namely the lower and upper housing edges 56 and 58, direct the watering device 10 toward the stable rest position (FIG. 4, left hand side of page). The final forward pivot edge is defined by the most forward portions of the upper edge 46 on opposite sides of the indentation 52. The watering device 10 then lands in the stable rest position in which it is supported on the upper surface 42.

An alternative nozzle 100 is shown in FIG. 5. The nozzle 100 is a tubular structure with a threaded upper end portion 102 like the upper end portion of the nozzle 16 described above. A lower end portion 104 of the nozzle 100 has a long section 106 and a short section 108. A divider wall 110 separates the two sections 106 and 108 from each other along their lengths. A flexible tube 112 extends upward through the short section 108 and the upper end portion 102 of the nozzle 100, and projects upward from the nozzle 100. The tube 112 is affixed to the short section 108 by an adhesive 116.

The upper end portion 102 of the nozzle 100 is screwed into the nozzle adapter 25 (FIG. 6). The flexible tube 112 extends into the reservoir 19. Water will flow from the reservoir 19 to the open receiving basin 18 through the long nozzle section 106 until the water surface 118 reaches the bottom of the short nozzle section 108. While the water flows downward through the long nozzle section 106, air flows upward into the reservoir 19 through the tube 112. When the water surface 118 reaches the bottom of the short nozzle section 108, a surface seal 120 is established. The surface seal 120 blocks a further flow of air upward into the tube 112 so that water can no longer flow downward to the receiving basin 18 through the long section 106 of the nozzle 100.

As compared with the nozzle 16, the nozzle 100 may inhibit the generation of an audible "glug" sound as water drains from the reservoir 19 when the surface seal 120 is broken. Alternatively, the audible sound may be inhibited by providing a sponge-like insert 200 in the lower end portion of the nozzle 16, as shown in FIG. 7, or by providing a nozzle 202 with a ring of apertures 204 at the level of the surface seal, as shown in FIG. 8.

The invention has been described with reference to a preferred embodiment. Those skilled in the art will perceive improvements, changes and modifications. Such improvements, changes and modifications are intended to be within the scope of the claims.

The following is claimed:

1. Apparatus for use with an open receiving basin, said apparatus comprising:

a tank structure enclosing a reservoir, said tank structure being configured to have an upright position;

a support structure configured to support said tank structure above a floor surface in said upright position; and a nozzle oriented to drain said reservoir to the open receiving basin when said tank structure is in said upright position;

said tank structure being further configured to have a stable rest position when overturned from said upright position, said nozzle being oriented not to drain said reservoir when said tank structure is in said stable rest position;

said nozzle having an edge configured so that said tank structure pivots about said edge as said tank structure rolls from said upright position to said stable rest position;

said nozzle being deformable to decrease fluid flow out of said reservoir while said apparatus is pivoting toward said stable rest position.

2. Apparatus for use with an open receiving basin, said apparatus comprising:

an elongated tank structure enclosing a reservoir, said tank structure being configured to have an upright position;

a support structure configured to support said tank structure above a floor surface in said upright position, said support structure comprising legs located at opposite ends of said elongated tank structure; and a nozzle oriented to drain said reservoir to the open receiving basin when said tank structure is in said upright position, said nozzle projecting from said tank structure midway between opposite ends of said tank structure;

said nozzle having an edge configured so that said tank structure pivots about said edge as said tank structure rolls from said upright position to said stable rest position;

said nozzle being deformable to decrease fluid flow out of said tank while said apparatus is pivoting toward said stable rest position.

3. Apparatus for use with an open receiving basin, said apparatus comprising:

a tank structure enclosing a reservoir, said tank structure being configured to have an upright position;

a support structure configured to support said tank structure above a floor surface in said upright position; and a nozzle oriented to drain said reservoir to the open receiving basin when said tank structure is in said upright position;

said tank structure and said support structure together being configured to have a predetermined, stable landing position, so that, when disturbed from said upright position, said tank structure and said support structure together roll to said predetermined, stable landing position, said nozzle having a portion which is then located above said reservoir so as not to drain said reservoir when said tank structure is in said stable landing position;

wherein said nozzle has an edge configured so that said tank structure pivots about said edge as said tank structure rolls from said upright position to said predetermined, stable landing position.

4. Apparatus as defined in claim 3 wherein said nozzle is deformable to decrease fluid flow out of said reservoir while said apparatus is pivoting toward said predetermined, stable landing position.

5. Apparatus for use with an open receiving basin on a floor surface, said apparatus comprising:
   a tank structure enclosing a reservoir, said tank structure being configured to have an upright position;
   a support structure configured to stand upon the floor surface and support said tank structure above the floor surface in said upright position; and
   a nozzle oriented to drain said reservoir to the open receiving basin when said tank structure is in said upright position;
   said tank structure and said support structure together being configured to have a predetermined, stable landing position, so that, when disturbed from said upright position, said tank structure and said support structure together roll to said predetermined, stable landing position, said nozzle having a portion which is then located above said reservoir so as not to drain said reservoir when said tank structure is in said stable landing position;
   wherein said nozzle has a lower end portion with a circumferential array of apertures.

6. Apparatus for use with an open receiving basin on a floor surface, said apparatus comprising:
   a support structure having first and second legs, said legs being configured to stand upon the floor surface at locations spaced horizontally apart from each other;
   a tank structure enclosing a reservoir, said tank structure having a horizontally elongated configuration extending horizontally from said first leg to said second leg and being configured to have an upright position in which said tank structure is supported above said floor surface, and
   a nozzle projecting from said tank structure midway between said first and second legs of said support structure, said nozzle being oriented to drain said reservoir to the open receiving basin when said tank structure is in said upright position;
   said tank structure and said support structure together are configured to have a stable landing position, so that, when disturbed from said upright position, said tank structure and said support structure together roll to said predetermined, stable landing position;
   wherein said nozzle has an edge configured so that said tank structure pivots about said edge as said tank structure rolls from said upright position to said stable landing position.

7. Apparatus as defined in claim 6 wherein said nozzle is deformable to decrease fluid flow out of said tank while said apparatus is pivoting toward said stable rest position.

8. Apparatus for use with an open receiving basin on a floor surface, said apparatus comprising:
   a support structure having first and second legs, said legs being configured to stand upon the floor surface at locations spaced horizontally apart from each other;
   a tank structure enclosing a reservoir, said tank structure having a horizontally elongated configuration extending horizontally from said first leg to said second leg and being configured to have an upright position in which said tank structure is supported above said floor surface, and
   a nozzle projecting from said tank structure midway between said first and second legs of said support structure, said nozzle being oriented to drain said reservoir to the open receiving basin when said tank structure is in said upright position;
   said tank structure and said support structure together are configured to have a stable landing position, so that, when disturbed from said upright position, said tank structure and said support structure together roll to said predetermined, stable landing position;
   wherein said nozzle has an end, said apparatus further comprising a sponge-like insert at said end of said nozzle.

9. Apparatus for use with an open receiving basin on a floor surface, said apparatus comprising:
   a support structure having first and second legs, said legs being configured to stand upon the floor surface at locations spaced horizontally apart from each other;
   a tank structure enclosing a reservoir, said tank structure having a horizontally elongated configuration extending horizontally from said first leg to said second leg and being configured to have an upright position in which said tank structure is supported above said floor surface, and
   a nozzle projecting from said tank structure midway between said first and second legs of said support structure, said nozzle being oriented to drain said reservoir to the open receiving basin when said tank structure is in said upright position;
   said tank structure and said support structure together are configured to have a stable landing position, so that, when disturbed from said upright position, said tank structure and said support structure together roll to said predetermined, stable landing position;
   wherein said nozzle has a circumferential array of apertures.

10. Apparatus for use with an open receiving basin on a floor surface, said apparatus comprising:
    a support structure including a single pair of legs configured to stand upon the floor surface at locations spaced horizontally apart from each other;
    a tank structure enclosing a reservoir, said tank structure having a horizontally elongated configuration extending horizontally from one of said legs to the other of said legs and being configured to have an upright position in which said tank structure is supported above said floor surface by said single pair of legs, and
    a nozzle projecting from said tank structure at a location between said single pair of legs, said nozzle having an open end oriented vertically downward to establish a surface seal with liquid in the open receiving basin and thereby to drain said reservoir to the open receiving basin when said tank structure is in said upright position.

* * * * *